US005502929A

United States Patent [19]

Daniels

[11] Patent Number: 5,502,929
[45] Date of Patent: Apr. 2, 1996

[54] COMBINATION WIND AND SUN BARRIER

[76] Inventor: Duane D. Daniels, P.O. Box 67, Ainsworth, Nebr. 69210

[21] Appl. No.: 383,065

[22] Filed: Feb. 3, 1995

[51] Int. Cl.⁶ .............................. E04H 9/00; E04B 1/344
[52] U.S. Cl. ..................... 52/69; 52/68; 52/73; 135/95; 211/169; 248/458
[58] Field of Search .................................. 52/69, 68, 73, 52/64; 135/92, 95, 98, 900, 902; 256/26; 248/441.1, 454, 458; 434/408, 419; 211/169, 170; 160/351

[56] References Cited

U.S. PATENT DOCUMENTS

| 339,741 | 4/1886 | Clough | 434/419 X |
|---|---|---|---|
| 641,683 | 1/1900 | Evans | 434/419 |
| 986,852 | 3/1911 | Paro et al. | 52/69 X |
| 2,191,099 | 2/1940 | Shenton | 454/408 |
| 3,107,400 | 10/1963 | Anderson | 52/69 |
| 3,107,442 | 10/1963 | Levine | 434/419 X |
| 3,148,461 | 9/1964 | Johnson | 434/419 X |
| 3,226,891 | 1/1966 | Heirich | 52/73 |
| 3,800,484 | 4/1974 | Marshall | 52/69 |
| 3,899,164 | 8/1975 | Newman | 248/454 X |
| 4,432,381 | 2/1984 | Greenbaum | 135/902 X |

FOREIGN PATENT DOCUMENTS

| 1554181 | 12/1971 | Germany | 52/69 |
|---|---|---|---|
| 2251183 | 4/1974 | Germany | 52/69 |
| 0029280 | 12/1906 | United Kingdom | 434/419 |

Primary Examiner—Robert J. Canfield
Attorney, Agent, or Firm—Zarley, McKee, Thomte Voorhees & Sease; Mark D. Frederiksen

[57] ABSTRACT

A wind and sun barrier includes a barrier panel with a barrier screen effective to reduce wind velocity and to produce shade, the barrier panel pivotally mounted between a pair of support posts. The barrier panel may be pivoted from a vertical position, for blocking wind, to a horizontal position, providing shade thereunder. Releasable lock mechanisms are provided to maintain the barrier in the desired position. A plurality of barrier panels may be aligned between a plurality of posts, to form an elongated barrier wall oriented either vertically or horizontally, depending upon the weather conditions.

11 Claims, 3 Drawing Sheets 5,502,929

COMBINATION WIND AND SUN BARRIER

TECHNICAL FIELD

The present invention relates generally to fences for wind protection and trellises for sun protection, and more particularly to an improved combination barrier movable between positions for protection from the wind and sun.

BACKGROUND OF THE INVENTION

Farmers and ranchers have to deal with weather conditions in order to successfully raise cattle and other animals. In commercial feed lots, the two most important weather elements are the wind during winter, and the sun during summer.

In the prior art, lean-tos or fences would typically be provided in order to provide protection from blowing wind. In summer, a roofed structure was the only way to protect animals from the sun on a hot day. However, roofed and walled structures are quite expensive to build merely to provide protection from the wind and sun. In addition, prior art shelters were deficient in view of the fact that wind is desirable during the summer months to help cool the animal, while sun is desirable during the winter months to help warm the animals. Thus, prior art shelters would provide a barrier to the harmful weather element while also providing a barrier to a helpful weather element. Because hundreds of head of cattle may be lost in a single day because of a lack of breeze on a hot day, or exposure to the wind on a cold winter day, commercial feed lots require separate barriers which may be removed after a particular season.

SUMMARY OF THE INVENTION

It is therefore a general object of the present invention to provide an improved combination wind and sun barrier.

Another object is to provide a combination wind and sun barrier which is operable between positions blocking only the sun and only the wind.

Still another object of the present invention is to provide a combination wind and sun barrier which may be moved between barrier positions by one individual without additional assistance.

A further object is to provide a combination wind and sun barrier which is economical to manufacture, simple to use, and refined in appearance.

These and other objects will be apparent to those skilled in the art.

The wind and sun barrier of the present invention includes a barrier panel with a barrier screen effective to reduce wind velocity and to produce shade, the barrier panel pivotally mounted between a pair of support posts. The barrier panel may be pivoted from a vertical position, for blocking wind, to a horizontal position, providing shade thereunder. Releasable lock mechanisms are provided to maintain the barrier in the desired position. A plurality of barrier panels may be aligned between a plurality of posts, to form an elongated barrier wall oriented either vertically or horizontally, depending upon the weather conditions.

DESCRIPTION OF THE PREFERRED EMBODIMENT

Figure 1:
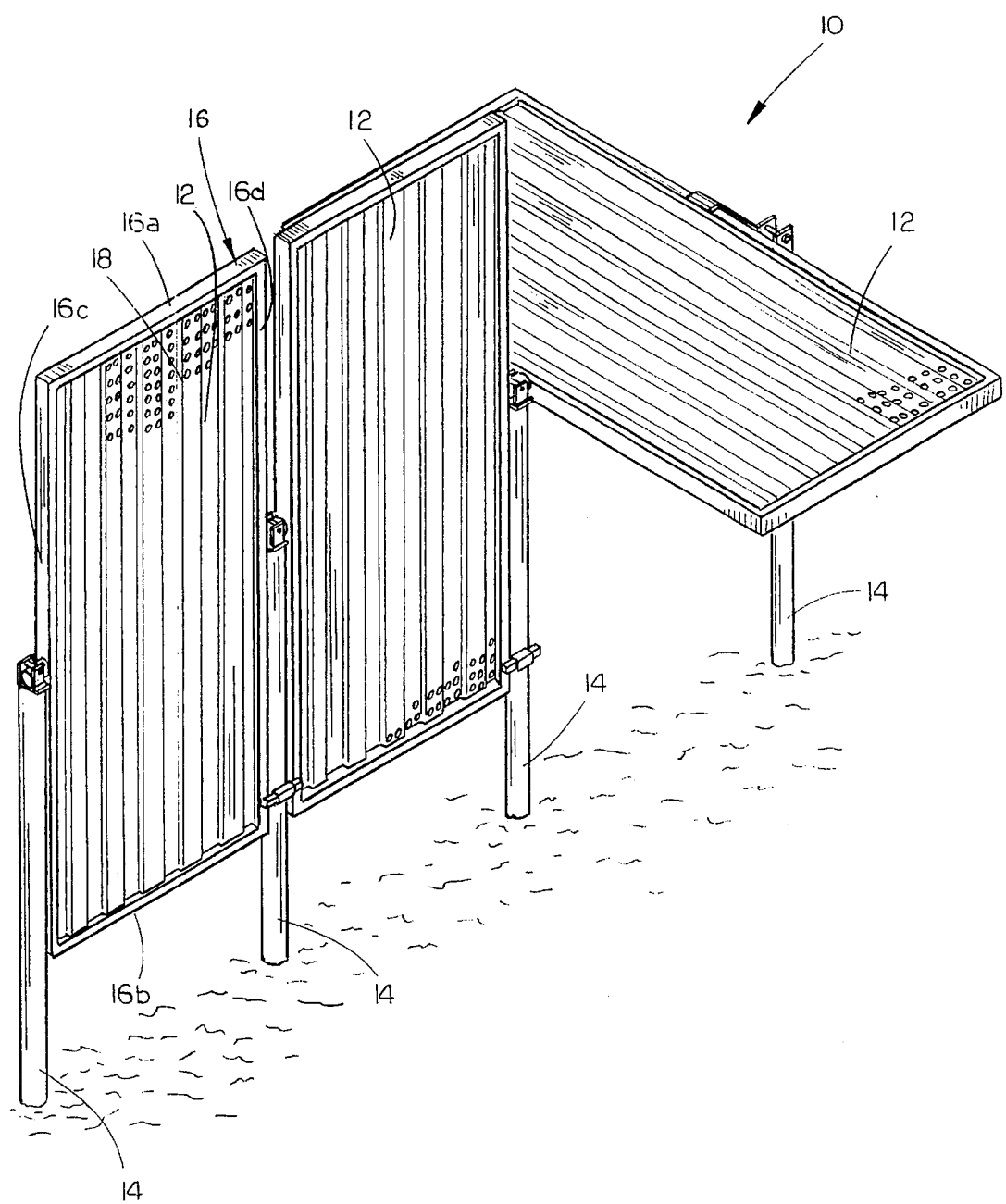
FIG. 1 is a perspective view of the combination wind and sun barrier of the present invention.

Referring now to the drawings, in which similar or corresponding parts are identified with the same reference numeral, and more particularly to FIG. 1, the combination wind and sun barrier of the present invention is designated generally at 10 and is shown with three barrier panels 12, oriented in two different positions, and pivotally mounted on a plurality of spaced apart vertically oriented support posts 14. Vertically oriented panels 12 serve to form a barrier against the wind, while the horizontally oriented barrier panel 12 provides shade.

Each barrier panel 12 is formed of a rectangular frame 16 having opposing transverse end members 16a and 16b, and opposing longitudinal side members 16c and 16d. A barrier screen 18 is mounted within frame 16 to provide wind and sun resistance. Preferably, barrier screen 18 is a sheet of 21% perforated steel, which is then corrugated in the longitudinal direction. Thus, as shown in FIG. 2, barrier screen 18 includes perforations 20 and longitudinal corrugations 22.

Figure 2:
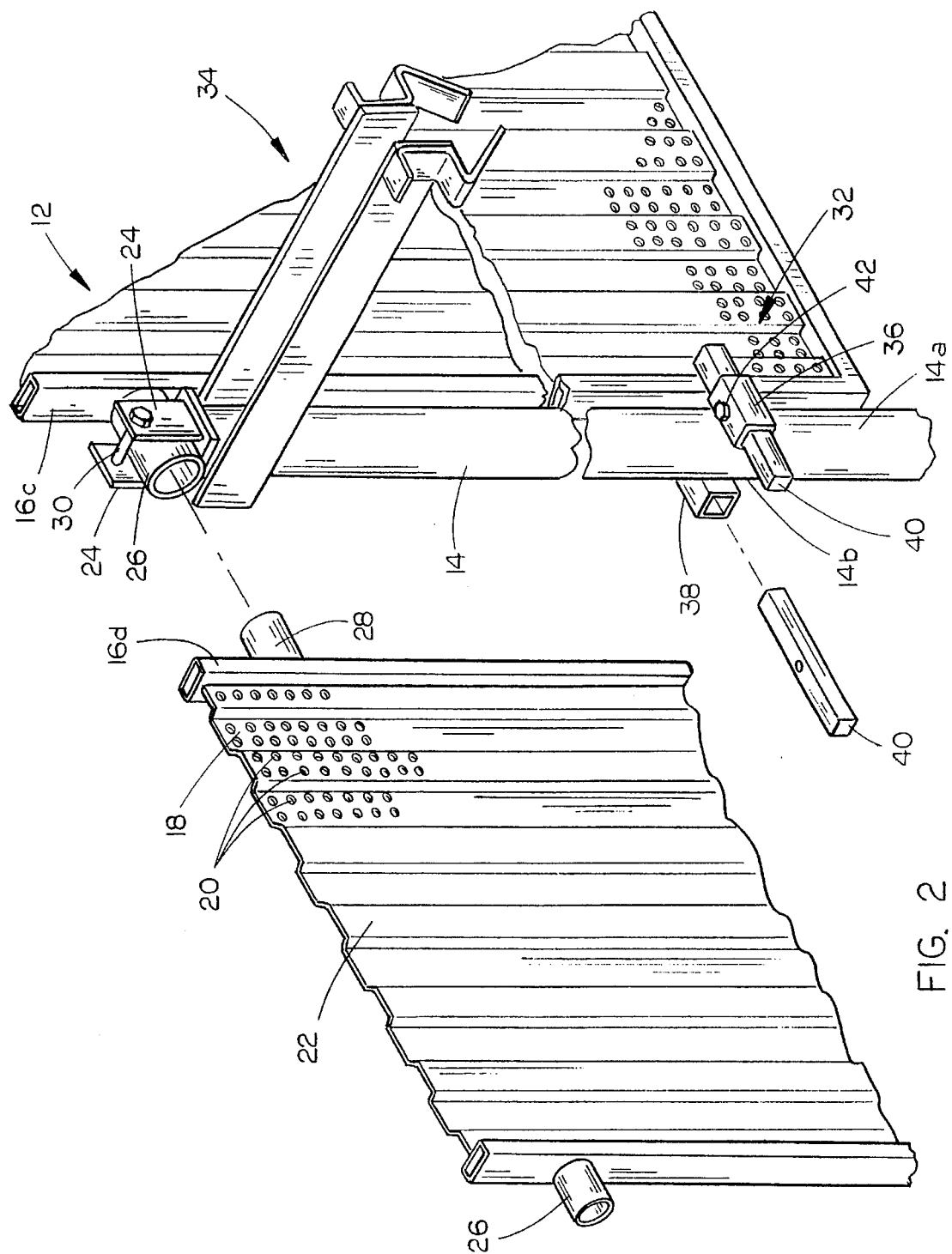
FIG. 2 is an enlarged perspective view of the connection of two panels of the invention with a support post.

Referring now to FIG. 2, each post 14 includes a pair of upstanding ears 24 spaced apart and projecting upwardly from the upper end of post 14, which will support a bearing tube 26 therebetween on the upper end of support tube 14. Bearing tube 26 is mounted to barrier panel side frame 16c and centered between ends 16a and 16b, such that barrier panel 12 is balanced on bearing tube 26. Frame side member 16d has a bearing rod 28 projecting therefrom centered between ends 16a and 16b and coaxial with the bearing tube 26 on the opposite frame side member 16c. Bearing rod 28 has a diameter less than the interior diameter of bearing tube 26 so that it may be journaled therein for rotational movement. As shown in FIG. 2, bearing tube 26 is journaled between ears 24 on top of bearing post 14 to permit rotational movement of barrier panel 12. A bolt 30 is inserted through apertures formed in the upper end of ears 24 to prevent accidental removal of the bearing tube upwardly out from between the ears 24.

The height of each post 14 is slightly greater than one-half the length of a barrier panel 12 such that each barrier panel 12 is rotatably supported above the ground and may freely rotate without contacting the ground. In order to restrain a barrier panel in either the vertical or horizontal position, each post includes a lower panel restraint, designated generally at 32 and an upper panel restraint designated generally at 34.

Lower panel restraint 32 is designed to keep barrier panels 12 oriented in a vertical position for wind resistance. Lower panel restraint 32 includes a pair of short tubular members 36 and 38 affixed to forward and rearward walls 14a and 14b of support posts 14 in horizontal orientations. Tubular members 36 and 38 have a length less than the width of forward and rearward walls 14a and 14b, so that they will not interfere with the pivotal movement of barrier panels 12. A pair of elongated locking bars 40 are provided, which are journaled through tubular members 36 and 38 and secured therein with set screws 42. Locking bars 40 have a length greater than the width of forward and rearward post walls 14a and 14b to project into the pivotal path of barrier panels 12 and restrain movement thereof. Thus, once barrier panel 12 is positioned vertically in alignment with support posts 14, locking bars 40 are journaled through tubular members 36 and 38 to retain the barrier panels 12 in the vertical orientation. Slidable movement of locking bars 40 in one direction or the other permits selective movement of one or both barrier panels on opposing sides of a given support post 14.

Figure 3:
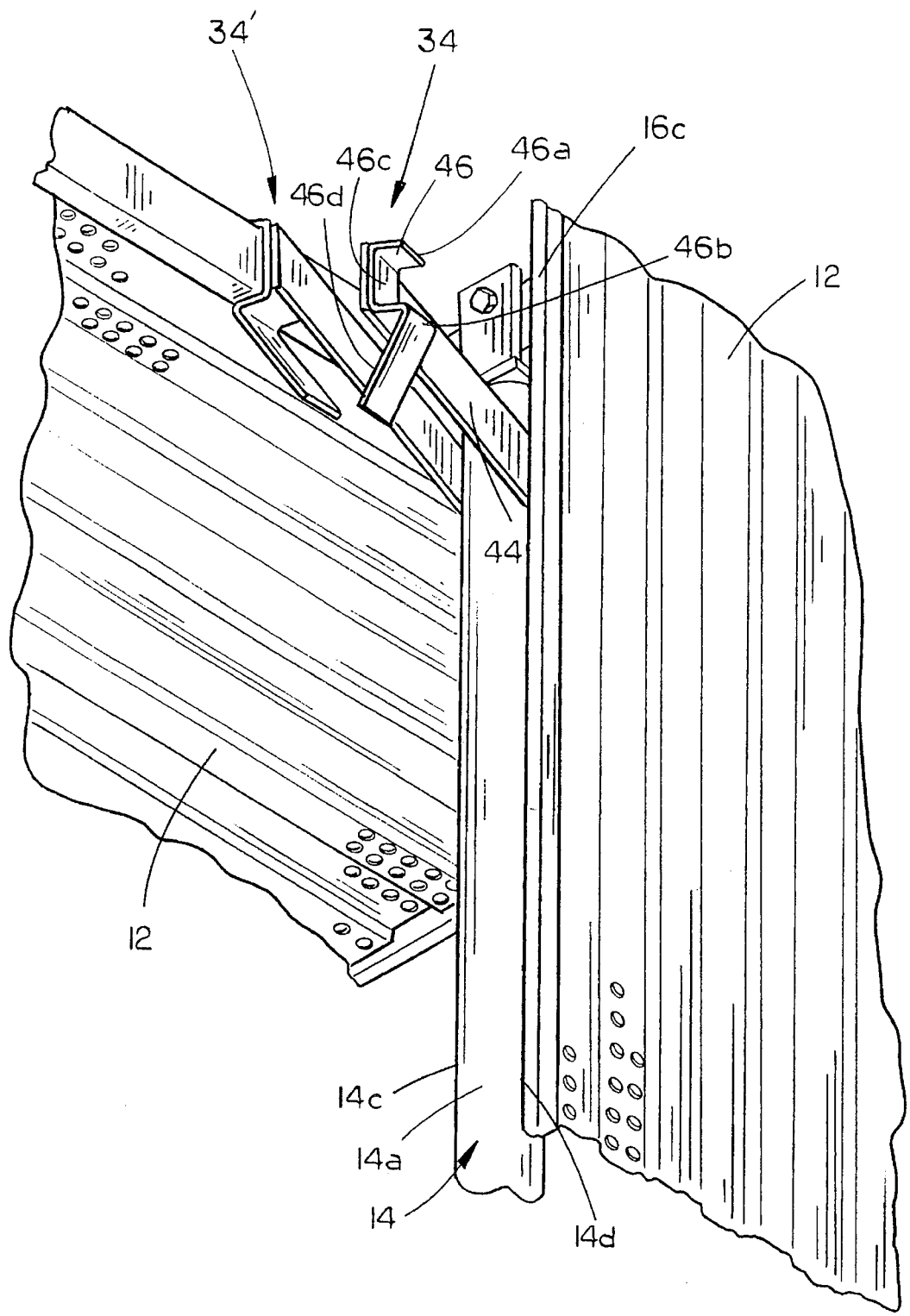
FIG. 3 is a perspective view of the retention clips with one panel retained in a horizontal position and a second panel in a vertical position.

Referring now to FIG. 3, the upper end of each support post 14 includes a pair of upper panel restraints 34 mounted on opposing side walls 14*c* and 14*d* of support posts 14 to retain barrier panels 12 in a horizontal orientation. Restraint 34 includes an elongated arm 44 projecting generally perpendicularly forwardly from side wall 14*d* with a bracket 46 affixed to the forward end thereof. Bracket 46 is generally U-shaped with a pair of upper and lower arms 46*a* and 46*b* projecting outwardly from a base 46*c*. Arms 46*a* and 46*b* also project outwardly relative to post 14 so as to receive the side frame member 16*c* of barrier panel 12 therebetween. Bracket 46 also includes a leg 46*d* extending downwardly and rearwardly from the free end of lower arm 46*b*. Bracket leg 46*d* serves to bias bracket 46 rearwardly as the barrier panel 12 is pivoted upwardly against the slope of leg 46*d*. It can be seen that frame member 16*c* will slide along bracket leg 46*d*, forcing bracket 46 away from barrier panel 12 until frame side member 16*c* is journaled between bracket upper and lower arms 46*a* and 46*b*. The arm 44 then returns bracket 46 towards the panel frame side member 16*c* to retain the barrier panel 12 in a horizontal position.

Post 14 includes a second upper panel restraint 34' on side wall 14*c* directly opposing panel restraint 34, and oriented in the opposite direction. In this way, a single support post 14 is able to retain two adjacent barrier panels 12 in the horizontal position.

The depending leg 46*d* of bracket 46 also permits simple release of the barrier panel from the panel restraint 34, permitting a person to grasp leg 46*d* and pull bracket 46 away from the panel to permit pivotal movement of the panel.

In operation, it is preferred to provide a plurality of barrier panels 12 between a plurality of support posts 14, as shown in FIG. 1. During the winter months the panels are oriented in the vertical position and retained in place by locking bars 40, as shown in FIG. 2. The use of 21% perforated steel with longitudinal corrugations has been found effective to produce a 45 mph wind on one side of the barrier panels to a minimal breeze within 12 inches of the leeward side of the barrier panels. Approximately 18 inches from the leeward side of the panel no air movement can be felt. At the same time, the use of perforations decreases the wind resistance of the barrier panel 12 such that the panel is less likely to transmit large dynamic forces from high wind velocities. Thus, the barrier panels 12 provide an effective wind break, yet permit the sun to warm animals positioned on the leeward side of the wind break.

During the summer months, each barrier panel 12 may be individually pivoted to a horizontal position to provide shade. The repositioning of the barrier panels may be easily accomplished by only one individual. First, set screw 42 is loosened to permit the forward locking bar 40 to be moved within tubular member 36, thereby permitting pivotal movement of one of the barrier panels 12. As the panel 12 is pivoted on bearing tube 26 and bearing rod 28, frame side member 16*c* will contact the sloped depending leg 46*d* of bracket 46, biasing bracket 46 outwardly until the barrier panel 12 is in a horizontal position. Elongated arm 44 then biases bracket 46 into engagement on barrier panel 12, to retain the barrier panel in the horizontal position. The rancher may then pivot successive barrier panels 12 until all panels are locked in the horizontal position to provide shade for the rancher's animals.

Whereas the invention has been shown and described in connection with the preferred embodiment thereof, many modifications, substitutions and additions may be made which are within the intended broad scope of the appended claims.

I claim:

1. A wind and sun barrier apparatus, comprising:

a barrier panel having opposing transverse ends, opposing longitudinal sides, and a barrier screen formed of a sheet of perforated material, extending between the sides and ends effective to reduce wind velocity of a leeward side and to produce shade thereunder;

said barrier panel pivotally mounted on a first support post for selective pivotal movement between a first position oriented generally vertically, and a second position oriented generally horizontally;

said barrier screen including vertical corrugations extending between said transverse ends, said corrugations generally parallel with one another and the longitudinal sides of said panel; and means for selectively restraining said barrier panel in the first and second positions.

2. The apparatus of claim 1, further comprising a second support post spaced apart from the first support post, and said barrier panel pivotally mounted between said first and second posts for selective pivotal movement between the first and second positions.

3. The apparatus of claim 2, further comprising a pair of pivot bearings on opposing longitudinal sides of said panel generally midway between the ends, said pivot bearings operably connected to said first and second posts to pivot Said panel about said bearings.

4. The apparatus of claim 3, wherein said means for selectively restraining the panel in the first and second positions includes a first restraint mounted at an upper end of said first post for selectively locking the panel in a horizontal position.

5. The apparatus of claim 4, wherein said means for selectively restraining the panel in the first and second positions includes a second restrain mounted at a lower end of said first post for selectively locking the panel in a vertical position.

6. The apparatus of claim 4, wherein said first post is generally vertical, with lower and upper ends, and wherein said first restraint includes an arm projecting generally perpendicularly from a upper end of said post and having a bracket at the forward end thereof, said bracket having a shape to receive and retain one side of said panel therein, when the panel is in the first position.

7. The apparatus of claim 1, wherein said barrier screen is approximately 21% perforated.

8. A wind and sun barrier apparatus, comprising:

a barrier panel having opposing transverse ends, opposing longitudinal sides, and a barrier screen extending between the sides and ends effective to reduce wind velocity of a leeward side and to produce shade thereunder;

said barrier panel pivotally mounted between first and second spaced-apart support posts for selective pivotal movement between a first position oriented generally vertically, and a second position oriented generally horizontally;

a pair of pivot bearings on opposing longitudinal sides of said panel generally midway between the ends, said pivot bearings operably connected to said first and second posts to pivot said panel about said bearings; and means for selectively restraining said barrier panel in the first and second positions, including a first restraint mounted at an upper end of said first post for selectively locking the panel in a horizontal position and a second restraint mounted at a lower end of said first post for selectively locking the panel in a vertical position.

9. The apparatus of claim 8, wherein said first post includes upper and lower ends, and wherein said second restraint includes a pair of elongated locking bars selectively slidably journaled through tubular members mounted at the lower end of said post, said locking bars having a length to extend within the pivotal path of the panel, to restrain the panel in a vertical position therebetween.

10. A wind and sun barrier apparatus, comprising:

a barrier panel having opposing transverse ends, opposing longitudinal sides, and a barrier screen extending between the sides and ends effective to reduce wind velocity of a leeward side and to produce shade thereunder;

said barrier panel pivotally mounted between first and second spaced-apart support posts for selective pivotal movement between a first position oriented generally vertically, and a second position oriented generally horizontally;

said posts oriented generally vertically, with lower and upper ends;

a pair of pivot bearings on opposing longitudinal sides of said panel generally midway between the ends, said pivot bearings operably connected to said first and second posts to pivot said panel about said bearings; and means for selectively restraining said barrier panel in the first and second positions, including a first restraint mounted at an upper end of said first post for selectively locking the panel in a horizontal position;

said first restraint including an arm projecting generally perpendicularly from the upper end of said first post and having a bracket at a forward end thereof, said bracket having a shape to receive and retain one side of said panel therein when the panel is in the first position.

11. A wind and sun barrier apparatus, comprising:

a barrier panel having opposing transverse ends, opposing longitudinal sides, and a barrier screen formed of a sheet of perforated material, said sheet being approximately 21% perforated, extending between the sides and ends effective to reduce wind velocity of a leeward side and to produce shade thereunder;

said barrier panel pivotally mounted on at least one support post for selective pivotal movement between a first position oriented generally vertically, and a second position oriented generally horizontally; and means for selectively restraining said barrier panel in the first and second positions.

* * * * *